United States Patent
Yang et al.

(10) Patent No.: US 11,145,081 B2
(45) Date of Patent: Oct. 12, 2021

(54) VOICE PROMPTING METHOD OF SAFETY WARNING

(71) Applicant: Compal Electronics, Inc., Taipei (TW)

(72) Inventors: Shih-Hao Yang, Taipei (TW); Hui-Chen Chen, Taipei (TW); Chieh-Yuan Huang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 100 days.

(21) Appl. No.: 16/749,505

(22) Filed: Jan. 22, 2020

(65) Prior Publication Data

US 2021/0192775 A1    Jun. 24, 2021

(30) Foreign Application Priority Data

Dec. 18, 2019    (TW) .................................. 108146455

(51) Int. Cl.
| | |
|---|---|
| *G06K 9/62* | (2006.01) |
| *G06K 9/00* | (2006.01) |
| *G08G 1/005* | (2006.01) |
| *G06T 7/246* | (2017.01) |
| *G06T 7/73* | (2017.01) |
| *G10L 13/00* | (2006.01) |

(52) U.S. Cl.
CPC .............. *G06T 7/73* (2017.01); *G06K 9/0063* (2013.01); *G06K 9/6267* (2013.01); *G06T 7/246* (2017.01); *G08G 1/005* (2013.01); *G10L 13/00* (2013.01); *G06T 2207/20084* (2013.01)

(58) Field of Classification Search
None
See application file for complete search history.

(56) References Cited

U.S. PATENT DOCUMENTS

| | | |
|---|---|---|
| 8,195,394 B1 | 6/2012 | Zhu et al. |
| 8,676,498 B2 | 3/2014 | Ma et al. |
| 9,811,765 B2 | 11/2017 | Wang et al. |

(Continued)

FOREIGN PATENT DOCUMENTS

| | | |
|---|---|---|
| CN | 105973264 A | 9/2016 |
| CN | 106859929 B | 11/2019 |

(Continued)

OTHER PUBLICATIONS

TengYuan Chang, Talking about recurrent neural network (RNN) and long and short-term memory model (LSTM), https://medium.com, Feb. 16, 2019.

*Primary Examiner* — Idowu O Osifade
(74) *Attorney, Agent, or Firm* — Kirton McConkie; Evan R. Witt

(57) ABSTRACT

A voice prompting method includes steps of: providing a wearable electronic device, obtaining an image and performing an image processing on the image, detecting and identifying a plurality of objects in the image, classifying and judging danger levels of the objects to generate a judgment result, generating a safety warning message corresponding to each of the objects presently having the danger level higher than a specific danger level according to the judgment result, and transforming the safety warning message into a voice form and prompting with the voice form of the safety warning message. Therefore, it can help a user avoid danger and effectively enhance the safety of walking of the user.

8 Claims, 8 Drawing Sheets

(56) References Cited

U.S. PATENT DOCUMENTS

| | | |
|---|---|---|
| 9,928,432 B1 | 3/2018 | Sathyanarayana et al. |
| 2013/0216093 A1 | 8/2013 | Lee et al. |
| 2014/0253588 A1 | 9/2014 | Mandala |
| 2017/0330447 A1* | 11/2017 | Mehta .................. G08B 26/00 |
| 2018/0189568 A1 | 7/2018 | Powderly et al. |
| 2019/0087944 A1 | 3/2019 | Chakraborty et al. |
| 2019/0307328 A1* | 10/2019 | Tran .................. G08B 21/0423 |
| 2019/0378509 A1* | 12/2019 | Chae ...................... G10L 15/22 |
| 2019/0385051 A1* | 12/2019 | Wabgaonkar .......... G06N 3/084 |
| 2019/0392858 A1* | 12/2019 | Lee .......................... G06N 3/08 |
| 2020/0026965 A1* | 1/2020 | Guo .................... G06N 3/0454 |
| 2020/0380839 A1* | 12/2020 | Sifuna ................ G08B 21/182 |
| 2021/0065338 A1* | 3/2021 | Peri ........................ G06T 11/00 |
| 2021/0142788 A1* | 5/2021 | Choi ................ H04W 72/1268 |
| 2021/0158802 A1* | 5/2021 | Lee .................. H04W 72/1268 |
| 2021/0174209 A1* | 6/2021 | Zhuang ................ G06N 3/0454 |

FOREIGN PATENT DOCUMENTS

| | | |
|---|---|---|
| TW | 201621833 A | 6/2016 |
| TW | 201944283 A | 11/2019 |

\* cited by examiner

VOICE PROMPTING METHOD OF SAFETY WARNING

CROSS-REFERENCE TO RELATED APPLICATION

This application claims priority from Taiwan Patent Application No. 108146455, filed on Dec. 18, 2019, the entire contents of which are incorporated herein by reference for all purposes.

FIELD OF THE INVENTION

The present invention relates to a voice prompting method, and more particularly to a voice prompting method of safety warning applied to a wearable electronic device.

BACKGROUND OF THE INVENTION

Traffic is a subject that humans often need to face. Whether indoors or outdoors, the most basic and simple way of transportation is walking. In fact, obstacles or dangers are usually encountered while walking, and sudden threats are always happened unexpectedly without preparing.

For most people, after the eyes receive the information of the surrounding environment, the brain still needs a certain reaction time to deal with the situation and then act to dodge obstacles or dangers so as to complete each time of walking.

However, walking outdoors is a difficult task for people with poor vision, no vision, or poor response capability. Failure to respond to the conditions on the road may directly lead to injuries and deaths, and it is not easy to change the walking route.

Most of the existing assist-prompting methods are assisted by the live assistant to pay attention to the road conditions and correct the walk route, but the live assistant may not always be available online at any time. If it is needed to use the service temporarily, a user may not be able to get help. Therefore, there are drawbacks and disadvantages such as having to ask others for help and not being able to use it anytime and anywhere.

Therefore, there is a need of providing a voice prompting method of safety warning distinct from the prior art in order to solve the above drawbacks.

SUMMARY OF THE INVENTION

Some embodiments of the present invention are to provide a voice prompting method of safety warning in order to overcome at least one of the above-mentioned drawbacks encountered by the prior arts.

The present invention provides a voice prompting method of safety warning. By classifying danger levels of objects in the image, generating the safety warning message corresponding to the objects having higher danger level, and transforming the safety warning message into a voice form so as to prompt, it can help a user avoid danger and effectively enhance the safety of walking of the user.

The present invention also provides a voice prompting method of safety warning. Through deep learning and machine learning, calculating features with the neural network and manners of capturing feature points, the two-step classification is implemented. The basic danger levels of the objects to the user are firstly classified in the first classification, the speed of the user and the speeds of the objects are secondly classified in the second classification, and finally the two-step classification is totally considered so as to generate the judgment result through the decision of machine learning, so that the most important safety warning message at present can be precisely prompted, and further the walking of the user assisted by the artificial intelligence can be implemented and the advantages of not being limited by space and time and having no need to asking for help can be achieved. Moreover, a navigation system may assist the user to correct the walk route.

In accordance with an aspect of the present invention, there is provided a voice prompting method of safety warning. The voice prompting method of safety warning includes steps of (a) providing a wearable electronic device, (b) obtaining an image and performing an image processing on the image, (c) detecting and identifying a plurality of objects in the image, (d) classifying and judging danger levels of the objects to generate a judgment result, (e) generating a safety warning message corresponding to each of the objects presently having the danger level higher than a specific danger level according to the judgment result, and (f) transforming the safety warning message into a voice form and prompting with the voice form of the safety warning message.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
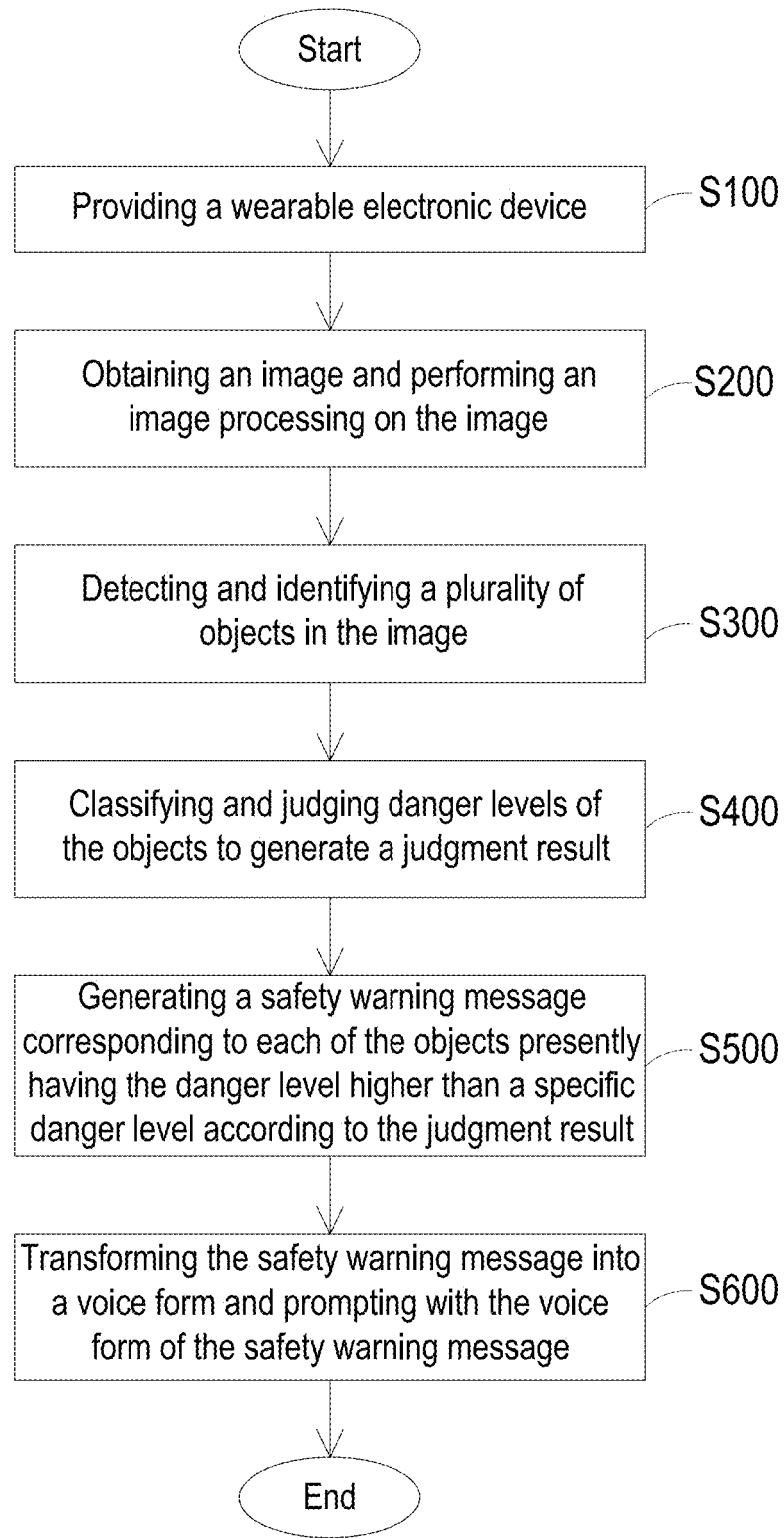
FIG. 1 schematically illustrates the flow chart of a voice prompting method of safety warning according to an embodiment of the present invention.

Please refer to FIG. 1. FIG. 1 schematically illustrates the flow chart of a voice prompting method of safety warning according to an embodiment of the present invention. As shown in FIG. 1, a voice prompting method of safety warning includes steps as following. As shown in step S100, providing a wearable electronic device. Next, as shown in step S200, obtaining an image and performing an image processing on the image. Then, as shown in step S300, detecting and identifying a plurality of objects in the image. Next, as shown in step S400, classifying and judging danger levels of the objects to generate a judgment result. Next, as shown in step S500, generating a safety warning message corresponding to each of the objects presently having the danger level higher than a specific danger level according to the judgment result. Finally, as shown in step S600, transforming the safety warning message into a voice form and prompting with the voice form of the safety warning message. Therefore, it can help a user avoid danger and effectively enhance the safety of walking of the user.

It should be noted that in the step S500, the specific danger level can be preset in the wearable electronic as a default value, which can be a quantified value in the present invention and can be set according to characteristics of the user. Alternatively, the specific danger level can be continuously calculated and dynamically adjusted at a server end (e.g. a cloud server), but not limited herein. In addition, the danger level can be used to judge if a personal danger possibly occurs to the user. As a result, when it exists plural objects with danger levels higher than the specific danger level in the judgment result, it represents that the plural objects, each of which is possible to cause a personal danger to the user, are existed in the environment, and a plurality of safety warning messages will be generated accordingly. That is, the amount of the safety warning message is not limited to be one. Each of the safety warning message is corresponded to one of the objects with danger levels higher than the specific danger level. Correspondingly, in the step S600, if there exist plural safety warning messages, the plural safety warning messages will be transformed into voice forms so as to be sequentially played according to the danger levels from high to low.

In specific, the voice prompting method of safety warning of the present invention is based on the artificial intelligence to implement the visual odometry (VO) with the augmented reality (AR). The visual odometry is cooperated with deep learning, machine learning and image captioning to convert captured images into voice prompts for safety warning messages for the user.

Figure 2:
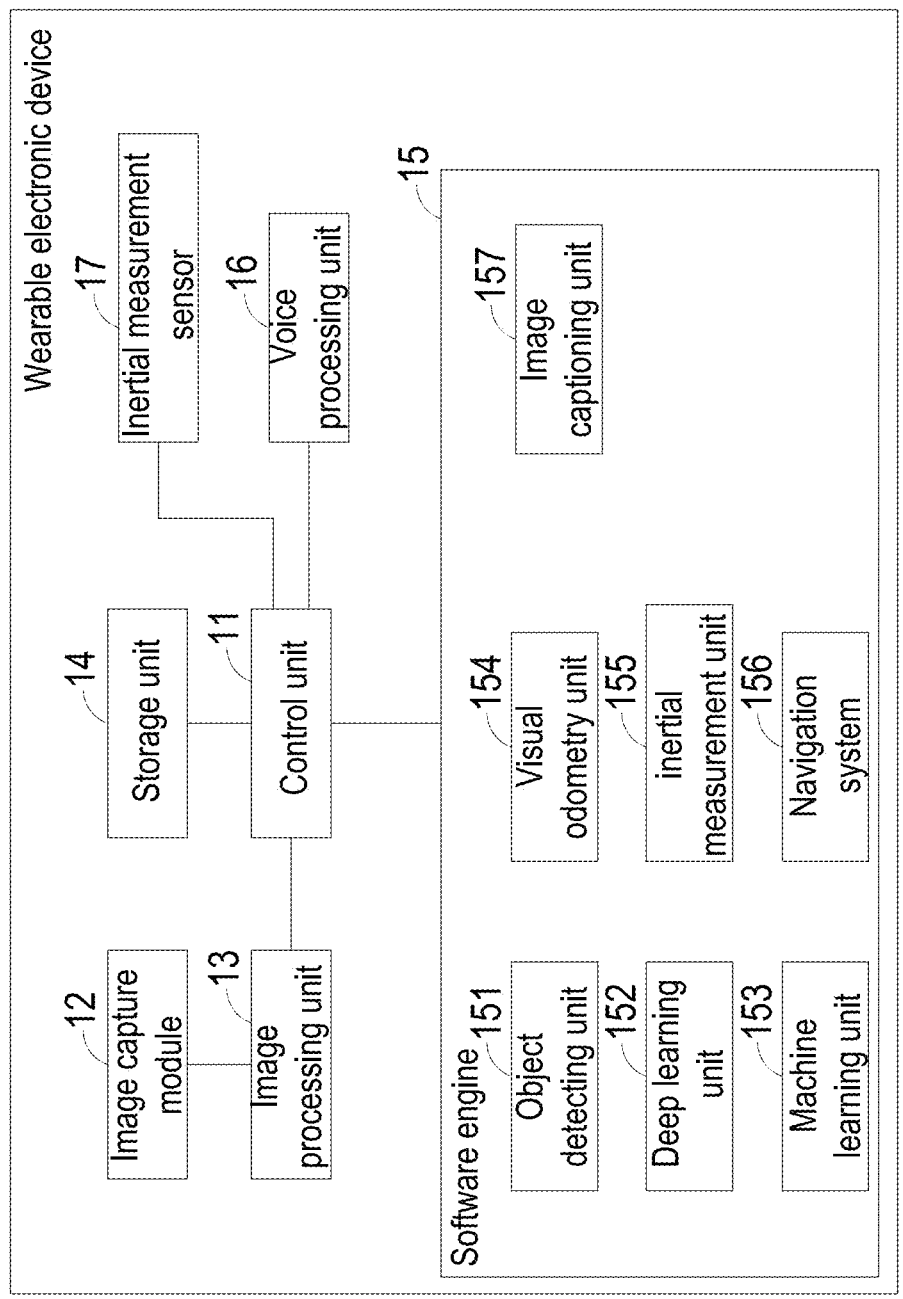
FIG. 2 schematically illustrates the configuration of a wearable electronic device according to an embodiment of the present invention.

The configuration of the wearable electronic device is described below. It should be noted that it is only one of the embodiments for implementing the voice prompting method of safety warning of the present invention. Other wearable electronic devices that can implement the present invention are also included in the teaching scope of the present invention. Please refer to FIG. 2. FIG. 2 schematically illustrates the configuration of a wearable electronic device according to an embodiment of the present invention. As shown in FIG. 2, a wearable electronic device 1 includes a control unit 11, an image capture module 12, an image processing unit 13, a storage unit 14, a software engine 15, a voice processing unit 16 and an inertial measurement sensor 17. The control unit 11 can be but not limited to a central processing unit (CPU). The image capture module 12 includes at least one image sensor (i.e. photosensitive component). The image processing unit 13 can be but not limited to a graphic processing unit (GPU). The storage unit 14 can be a memory or a flash drive. The voice processing unit 16 can be a hardware chip or a software unit. Meanwhile, the voice processing unit 16 may include a speaker. The inertial measurement sensor 17 is connected to the control unit 11 for obtaining inertial measurement values, such as angular velocities and accelerations, but not limited thereto.

Moreover, the software engine 15 includes an object detecting unit 151, a deep learning unit 152, a machine learning unit 153, a visual odometry unit 154, an inertial measurement unit (IMU) 155, a navigation system 156 and an image captioning unit 157. The object detecting unit 151, the deep learning unit 152, the machine learning unit 153, the visual odometry unit 154, the inertial measurement unit 155, the navigation system 156 and the image captioning unit 157 can be operated by the control unit 11, or can be each operated by a specific computing unit or a specific processing unit, thereby implementing the voice prompting method of safety warning of the present invention. It should be noted that the inertial measurement data obtained by the hardware unit, which is the inertial measurement sensor 17, is handled by the inertial measurement unit 155 in the software engine 15. The inertial measurement unit 15 includes software algorithms.

Please refer to FIG. 1 and FIG. 2 again. In some embodiments, the step S200 of the voice prompting method of safety warning may further include steps as following. At first, enabling an image capture module 12 to obtain the image (as step S210 shown in FIG. 4A). Then, performing the image processing on the image with an image processing unit 13 (as step S220 shown in FIG. 4A). Specifically, the image capture module 12 continuously captures images under fixed time intervals. The images are processed by the image processing unit 13. The image processing on the images is generally called "image preprocessing", which includes for example the gray scaling and Gaussian blur. The image preprocessing can make the image features clearer. However, it is not limited herein.

In some embodiments, the S300 of the voice prompting method of safety warning may further include steps as following. At first, performing an object detection on the image (as step S310 shown in FIG. 4A). Then, performing a feature capturing on the objects which are detected and utilizing a fully connected layer classification to identify the objects (as step S320 shown in FIG. 4A). Preferably, the object detection described herein uses a pre-trained convolution neural network (CNN) model, which stores the common objects as a training set. When the features of the object are completely captured, the detected objects are put into the CNN model for outputting a feature vector so as to finish the object detection through the fully connected layer classification of the CNN. In brief, the two steps may be implemented by the object detecting unit 151 and deep learning unit 152 with the first convolution neural network, and a plurality of feature vectors are outputted by the first convolution neural network.

Figure 3:
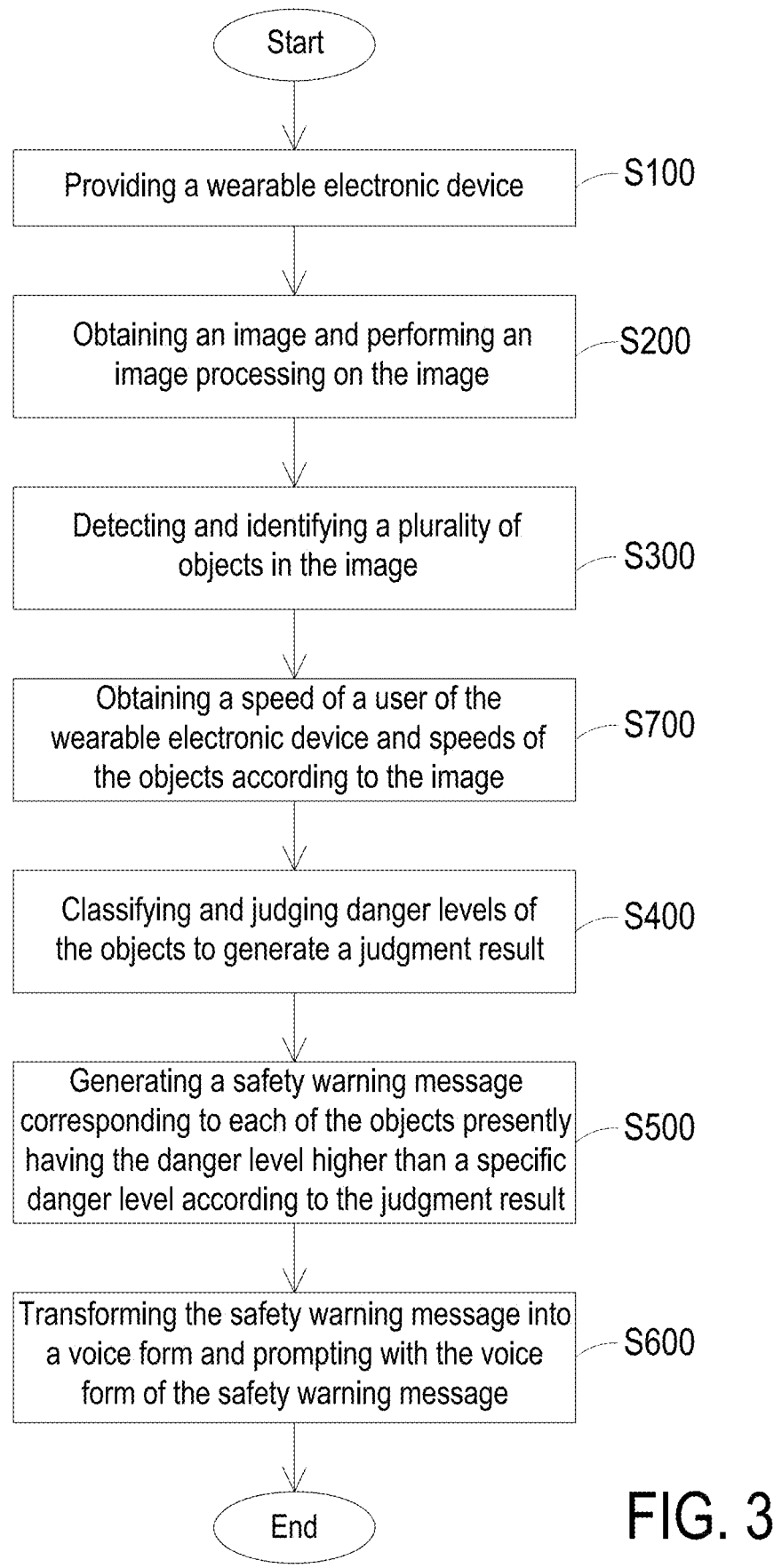
FIG. 3 schematically illustrates the flow chart of a voice prompting method of safety warning according to an embodiment of the present invention.

Please refer to FIG. 2 and FIG. 3. FIG. 3 schematically illustrates the flow chart of a voice prompting method of safety warning according to an embodiment of the present invention. As shown in FIG. 2 and FIG. 3, the voice prompting method of safety warning of the present invention may further includes a step S700 between the step S300 and the step S400. The step S700 is a step of obtaining a speed of a user of the wearable electronic device 1 and speeds of the objects according to the image. The step S700 can be implemented by the visual odometry unit 154 and the inertial measurement unit 155. The input of the visual odometry uses the image preprocessing accomplished in the step S200. The feature points in the images are found in this step for calculating and obtaining the speed of the user and the speeds of the objects.

Figure 4A:
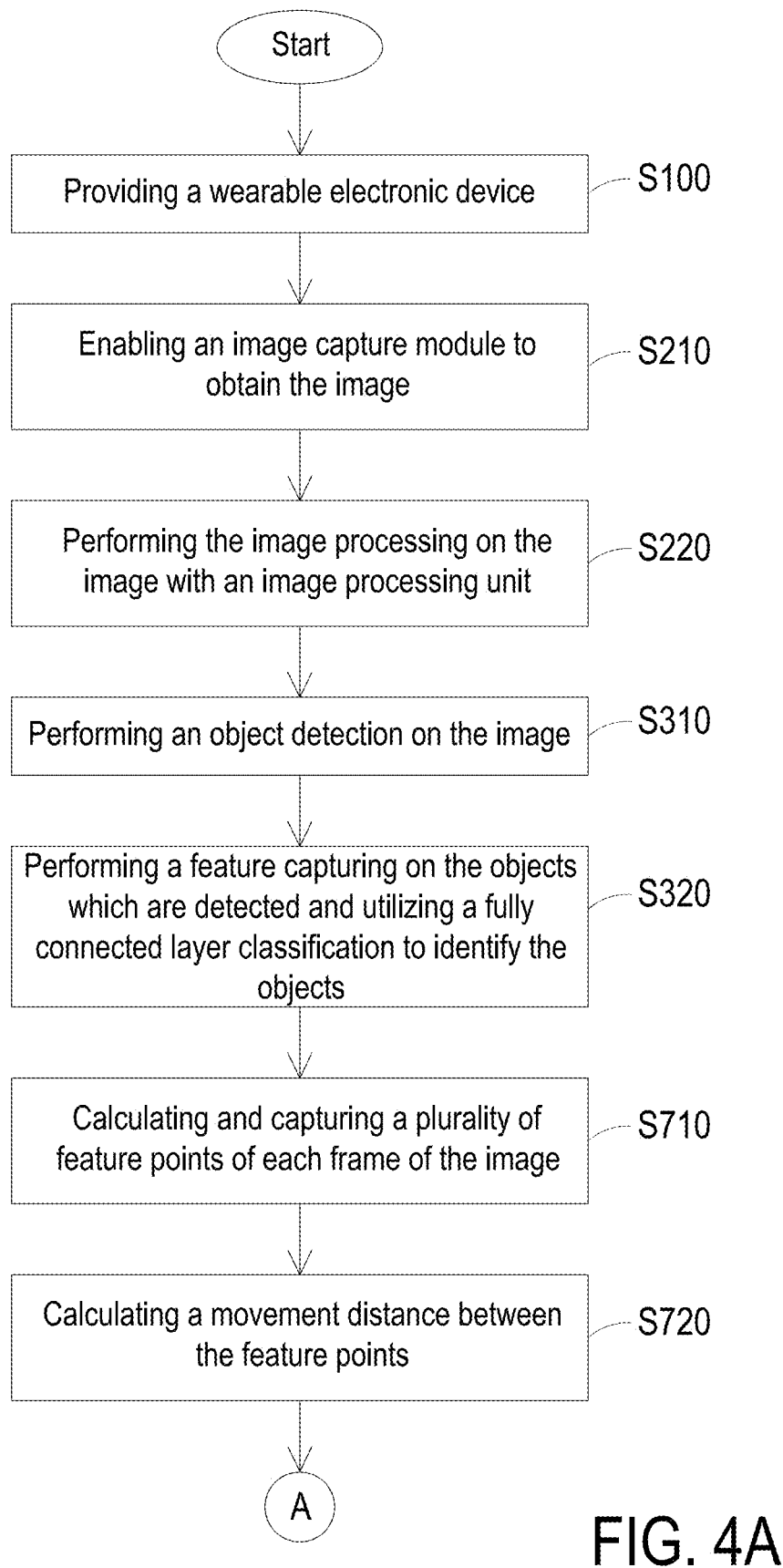
FIG. 4A schematically illustrates a part of the flow chart of a voice prompting method of safety warning according to an embodiment of the present invention.
Figure 4B:
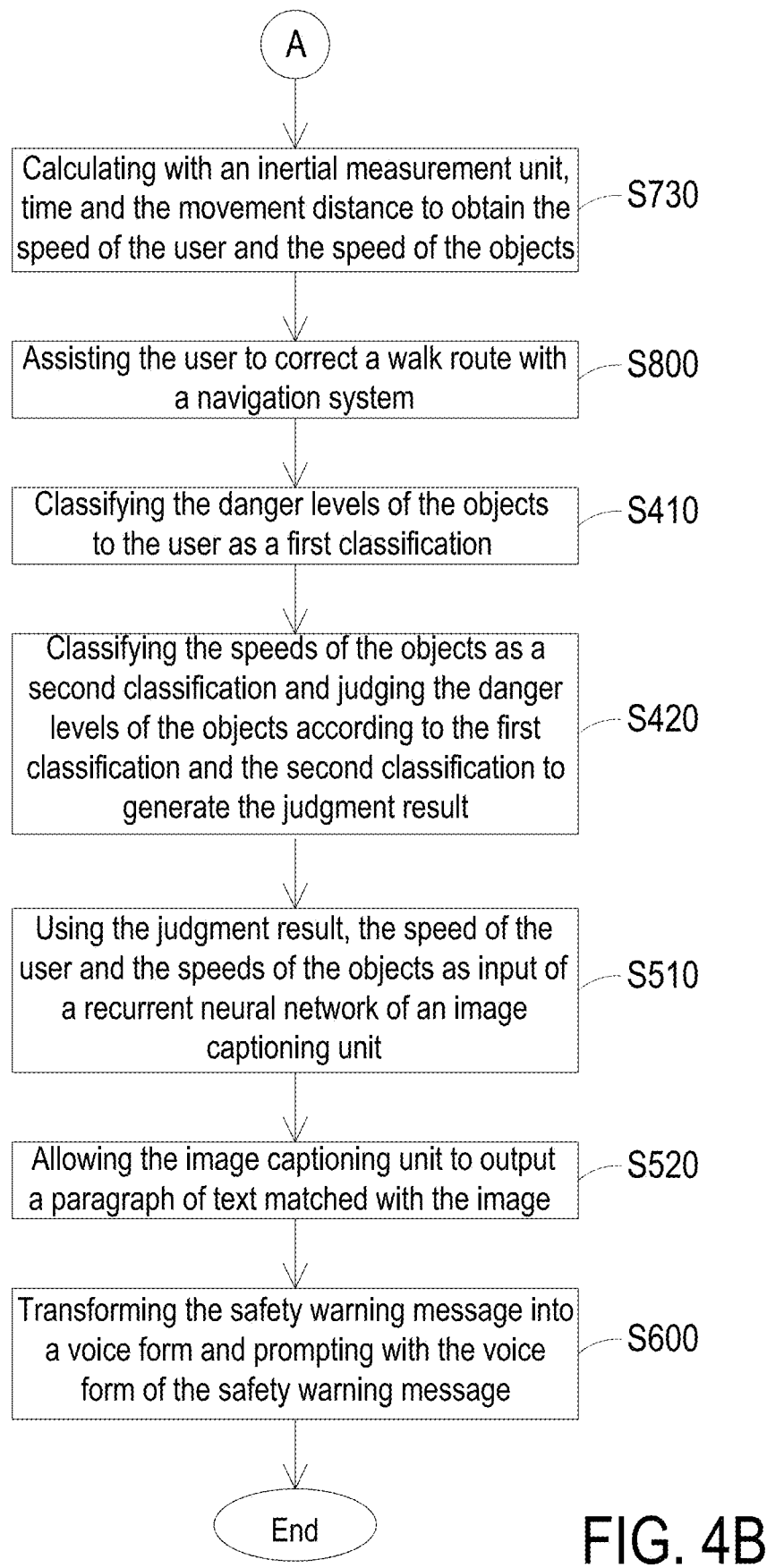
FIG. 4B schematically illustrates the rest part of the flow chart of the voice prompting method of safety warning shown in FIG. 4A.

Please refer to FIG. 2, FIG. 4A and FIG. 4B. FIG. 4A schematically illustrates a part of the flow chart of a voice prompting method of safety warning according to an embodiment of the present invention. FIG. 4B schematically illustrates the rest part of the flow chart of the voice prompting method of safety warning shown in FIG. 4A. Since the flow chart of the voice prompting method of safety warning of this embodiment is larger and longer, the flow chart is separated into two drawings as FIG. 4A and FIG. 4B, and the flow chart is linked at the joint point A. As shown in FIG. 2, FIG. 4A and FIG. 4B, the detailed steps of the step S200 described above are illustrated as the step S210 and the step S220, the detailed steps of the step S300 described above are illustrated as the step S310 and the step S320, and the detailed steps of the step S700 are illustrated as the step S710, the step S720 and the step S730. As shown in the step S710, calculating and capturing a plurality of feature points of each frame of the image. Next, as shown in the step S720, calculating a movement distance between the feature points. For example, a map is constructed for recording a walk route and a distance, but not limited thereto. Then, as shown in the step S730, calculating with an inertial measurement unit 155, time and the movement distance to obtain the speed of the user and the speed of the objects. Furthermore, after the step S700, the voice prompting method of safety warning of the present invention may include a step S800 of assisting the user to correct a walk route with a navigation system 156. The step S800 can be implemented through the present hardware configuration of the wearable electronic device 1 in a manner of voice prompting.

In some embodiments, the step S400 can be implemented by the control unit 11 with the machine learning unit 153, and the step S400 can include steps as following. Firstly, as shown in the step S410, classifying the danger levels of the objects to the user as a first classification. The danger levels indicated herein are the danger default values preset for different objects. For example, the danger default value of a truck is higher than the danger default value of a sedan. Moreover, the danger default value can be a fixed value, or can be appropriately adjusted during machine learning. Next, as shown in the step S420, classifying the speeds of the objects as a second classification and judging the danger levels of the objects according to the first classification and the second classification to generate the judgment result. Specifically, the type, the speed and the distance of the identified object can be known through the step S300 and the step S700. The first classification clearly gives a type for each object (e.g. a traffic light, a pedestrian, a car or a bicycle), but not limited herein. The second classification arranges the groups of the speed and/or the distance of the objects (e.g. distance less than 0.5 meters, distance equal to 0.5-1 meters, and distance equal to 1-1.5 meters), but not limited herein. According to the first classification and the second classification, the states set and the actions set, which can be possibly executed for each state, of the decision model, can be obtained by combining and arranging the types of the objects and the speeds and/or the distances of the objects. The corresponding scores can be given so as to be applied in the Deep Q Network.

Figure 5:
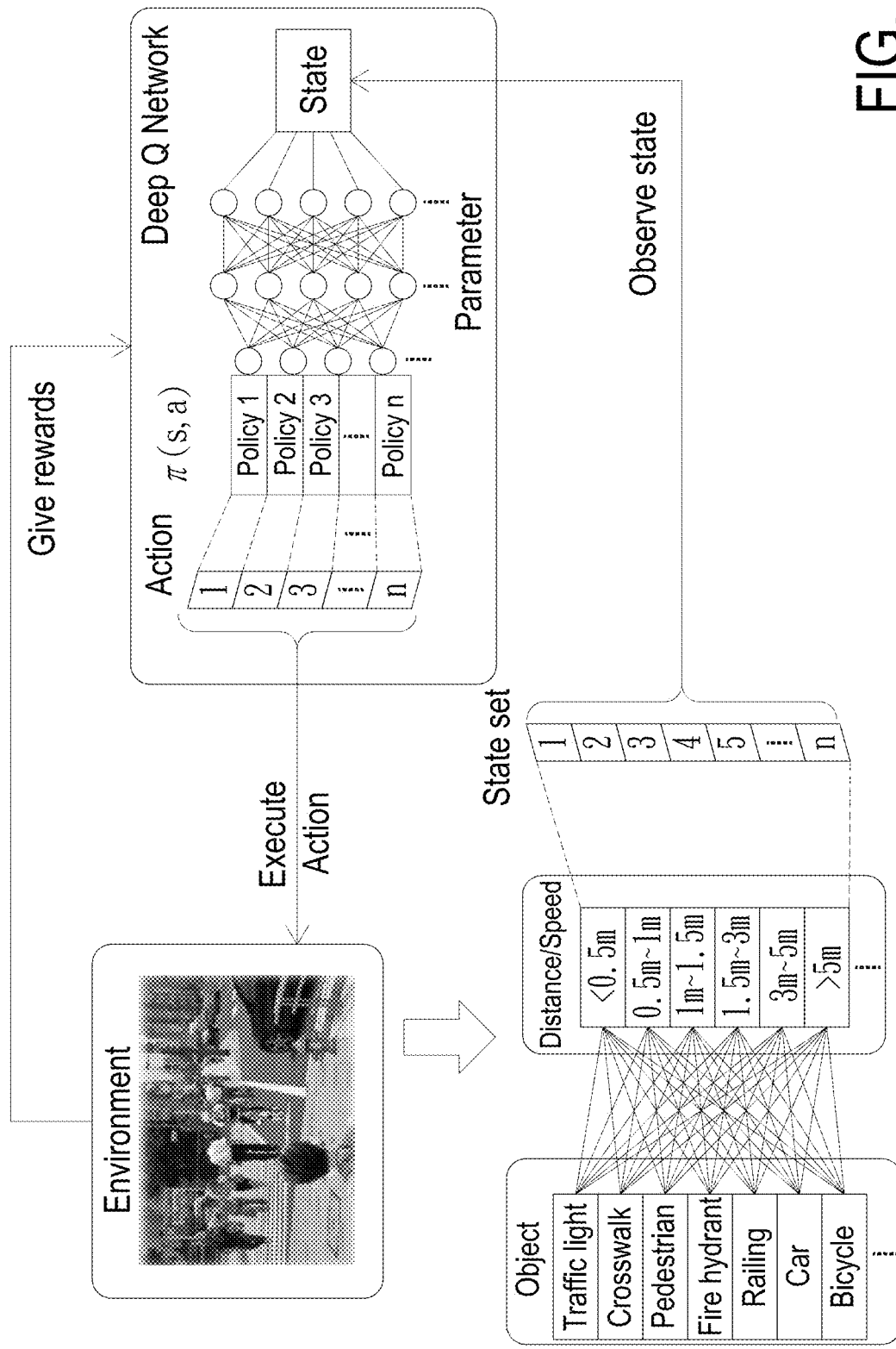
FIG. 5 schematically illustrates the configuration of Deep Q Network according to an embodiment of the present invention.

A simple configuration is described as following for realizing the Deep Q Network utilized in the present invention. Please refer to FIG. 4A, FIG. 4B and FIG. 5. FIG. 5 schematically illustrates the configuration of Deep Q Network according to an embodiment of the present invention. As shown in FIG. 4A, FIG. 4B and FIG. 5, a state (s) and an action (a) are the input of a maximum policy value $\pi(s, a)$. The maximum policy value $\pi(s, a)$ is a function. Under the present environment, the state of the present environment can be given by observing the composition objects and distances of the environment. The present state can be generated by the states set in a way of an observe state. This state is used as the input of Deep Q Network. Deep Q Network predicts the rewards of all possible operations and executes the action having the largest policy value under the environment state, such that the judgment result is generated. Meanwhile, through multiple iterative processes, positive or negative experience can be gained to train and improve the response to all states. In short, the input of Deep Q Network is implemented by computing the first classification combined with the second classification. The output of Deep Q Network can be continuously adjusted and improved through machine learning. Finally, the corresponding judgment result is obtained by Deep Q Network, and the judgment result may include the action having the maximum policy value of each object and its corresponding score of danger level.

Figure 6:
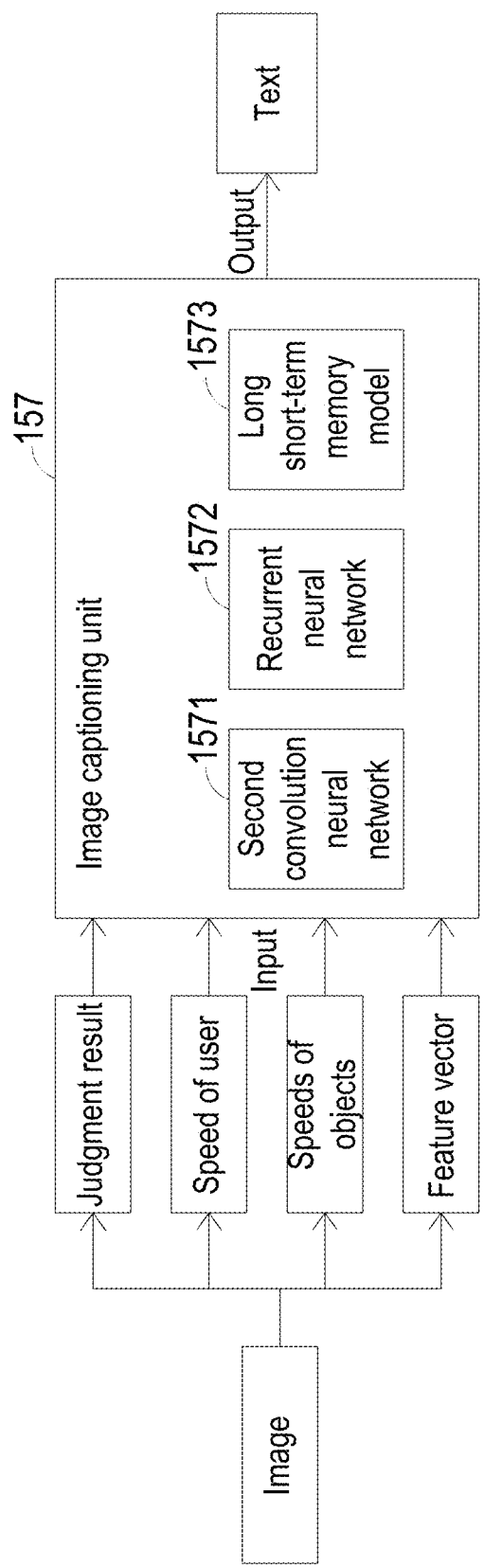
FIG. 6 schematically illustrates input and output of an image captioning unit according to an embodiment of the present invention.

Please refer to FIG. 1, FIG. 2, FIG. 4A, FIG. 4B and FIG. 6. FIG. 6 schematically illustrates input and output of an image captioning unit according to an embodiment of the present invention. As shown in FIG. 1, FIG. 2, FIG. 4A, FIG. 4B and FIG. 6, after the judgment result of the step described above is generated, the step S500 is performed. At first, if there exists any object with danger level higher than the specific danger level in the judgment result, the image captioning is utilized for describing and implemented by the image captioning unit 157. The image captioning unit 157 includes a second convolution neural network 1571, a recurrent neural network (RNN) 1572 and a long short-term memory model 1573. The step S500 further includes steps as following. Firstly, as shown in step S510, using the judgment result, the speed of the user and the speeds of the objects as input of a recurrent neural network 1572 of an image captioning unit 157. Next, allowing the image captioning unit 157 to output a paragraph of text matched with the image. In this embodiment, the feature vectors outputted by the first convolution neural network of the above-described step are applied as the output of the second convolution neural network 1571 so as to be the input of the long short-term memory model 1573. It should be noted that the first convolution neural network can be identical with or different from the second convolution neural network 1572, and the long short-term memory model 1573 can be a pre-trained model, but not limited herein.

Figure 7:
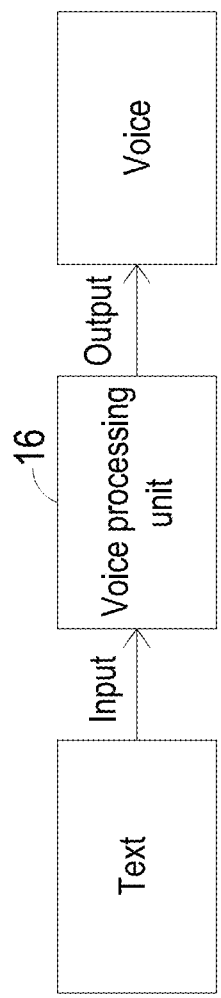
FIG. 7 schematically illustrates input and output of a voice processing unit according to an embodiment of the present invention.

Please refer to FIG. 2, FIG. 4A, FIG. 4B and FIG. 7. FIG. 7 schematically illustrates input and output of a voice processing unit according to an embodiment of the present invention. As shown in FIG. 2, FIG. 4A, FIG. 4B and FIG. 7, the paragraph of text outputted in the above-described step S520 is inputted to the voice processing unit 16 in the step S600. The voice processing unit 16 can be a text-to-speech (TTS) system. Through the neural network model of the TTS system, the inputted paragraph of text can be transformed into a voice form so as to be outputted. The voice form, which is a voice message, can be outputted by the speaker for implementation. For example, a voice message "a car is driven at 30 kilometers per hour in front left" can be narrated through the speaker, but not limited herein.

In some embodiments, the image acquisition method is not limited to the built-in image capture module of the wearable electronic device. It can also use the existing recording equipment (such as surveillance cameras) in the surrounding environment to obtain image through Internet of Things or other image streaming manners for analysis. In this way, the voice prompting method of safety warning constructed in the present invention can also assist determining the safety of walking of the user through images different from the range of the view angle of the wearable electronic device.

From the above description, the present invention provides a voice prompting method of safety warning. By classifying danger levels of objects in the image, generating the safety warning message corresponding to the objects having higher danger level, and transforming the safety warning message into a voice form so as to prompt, it can help a user avoid danger and effectively enhance the safety of walking of the user. Meanwhile, through deep learning and machine learning, calculating features with the neural network and manners of capturing feature points, the two-step classification is implemented. The basic danger levels of the objects to the user are firstly classified in the first classification, the speed of the user and the speeds of the objects are secondly classified in the second classification, and finally the two-step classification is totally considered so as to generate the judgment result through the decision of machine learning, so that the most important safety warning message at present can be precisely prompted, and further the walking of the user assisted by the artificial intelligence can be implemented and the advantages of not being limited by space and time and having no need to asking for help can be achieved. Moreover, a navigation system may assist the user to correct the walk route.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A voice prompting method of safety warning, comprising steps of:
   (a) providing a wearable electronic device;
   (b) obtaining an image and performing an image processing on the image;
   (c) detecting and identifying a plurality of objects in the image;
   (d) classifying and judging danger levels of the objects to generate a judgment result;
   (e) generating a safety warning message corresponding to each of the objects presently having the danger level higher than a specific danger level according to the judgment result; and
   (f) transforming the safety warning message into a voice form and prompting with the voice form of the safety warning message,
   wherein the voice prompting method of safety warning further comprises a step, between the step (c) and the step (d), of:
   (g) obtaining a speed of a user of the wearable electronic device and speeds of the objects according to the image,
   wherein the step (d) comprises steps of:
   (d1) classifying the danger levels of the objects to the user as a first classification; and
   (d2) classifying the speeds of the objects as a second classification and judging the danger levels of the objects according to the first classification and the second classification to generate the judgment result.

2. The voice prompting method of safety warning according to claim 1, wherein the step (b) comprises steps of:
   (b1) enabling an image capture module to obtain the image; and
   (b2) performing the image processing on the image with an image processing unit.

3. The voice prompting method of safety warning according to claim 1, wherein the step (c) comprises steps of:
   (c1) performing an object detection on the image; and
   (c2) performing a feature capturing on the objects which are detected and utilizing a fully connected layer classification to identify the objects.

4. The voice prompting method of safety warning according to claim 1, wherein the step (g) comprises steps of:
   (g1) calculating and capturing a plurality of feature points of each frame of the image;
   (g2) calculating a movement distance between the feature points; and
   (g3) calculating with an inertial measurement unit, time and the movement distance to obtain the speed of the user and the speed of the objects.

5. The voice prompting method of safety warning according to claim 1 further comprises a step, after the step (g), of:
   (h) assisting the user to correct a walk route with a navigation system.

6. The voice prompting method of safety warning according to claim wherein the step (e) comprises steps of:
   (e1) using the judgment result, the speed of the user and the speeds of the objects as input of a recurrent neural network of an image captioning unit; and
   (e2) allowing the image captioning unit to output a paragraph of text matched with the image.

7. The voice prompting method of safety warning according to claim 6, wherein the step (c) is implemented by a first convolution neural network, the first convolution neural network outputs a plurality of feature vectors, and the step (d) is implemented by a Deep Q Network.

8. The voice prompting method of safety warning according to claim 7, wherein the image captioning unit comprises a second convolution neural network, the recurrent neural network and a long short-term memory model, and the feature vectors are applied as output of the second convolution neural network so as to be input of the long short-term memory model.

* * * * *